Feb. 14, 1961 L. N. RIDENOUR ET AL 2,972,008

CODING METHODS AND SYSTEM

Filed April 23, 1956 3 Sheets-Sheet 1

INVENTORS
LOUIS N. RIDENOUR
WILLIAM F. GUNNING
BY [signature]
THEIR ATTORNEYS

INVENTORS
LOUIS N. RIDENOUR
BY WILLIAM F. GUNNING
Lyon & Lyon
THEIR ATTORNEYS

Feb. 14, 1961 L. N. RIDENOUR ET AL 2,972,008

CODING METHODS AND SYSTEM

Filed April 23, 1956 3 Sheets-Sheet 3

*INVENTORS*
LOUIS N. RIDENOUR
*BY* WILLIAM F. GUNNING
Lyon & Lyon
THEIR ATTORNEYS 2,972,008

CODING METHODS AND SYSTEM

Louis N. Ridenour, Los Angeles, and William F. Gunning, Anaheim, Calif., assignors, by mesne assignments, to Paramount Pictures Corporation, New York, N.Y., a corporation of New York Filed Apr. 23, 1956, Ser. No. 579,973

5 Claims. (Cl. 178—5.1)

This invention relates to coding methods and system for video and, more particularly, to an improvement therein, whereby to substantially reduce the possibility of statistical correlation and thus the breaking of the code.

An inherent limitation in video scrambling systems is that, in spite of the introduction of complicated scrambling functions, certain video discontinuities result from the scrambling which may be detected by correlation techniques to determine the manner in which the scrambling has been performed. Moreover, correlation theory may be utilized to define electronic circuits which then may automatically decode the scrambled transmissions, without the use of any information indicating the scrambling code or key. By correlation is meant the establishment of a relationship between information transmitted in a standard or so-called "noncoded" mode and information transmitted in a nonstandard or coded mode from which information for decoding may be derived.

One illustration of a video scrambling system wherein the scrambled sequence includes discontinuities which may be correlated in a simple manner is found in the system shown in Figure 10 of United States Patent Number 2,547,598, entitled Subscription, Image Transmission System and Apparatus, by E. M. Roschke, issued April 3, 1951. There, the scrambling is described as being achieved by altering the relationship between the video signal and the horizontal sync signals. This alternation is performed at a random rate and results in what may be termed "horizontal-shift" scrambling.

In the Roschke system mentioned above, the horizontal-sweep drive is actuated through a fixed-delay switch, in order to scramble the video transmissions. Horizontal-shift scrambling of this type may be correlated by comparing successive video lines in order to determine the magnitude of the differences therebetween. In addition, other correlation information may be obtained by comparing successive lines with appropriate shifts corresponding to the fixed shft provided by the delay line and switch of the Roschke system. Comparison of successive lines in this manner provides signals indicative of the presence or absence of a shift, and, if present, whether left or right. With this information, the video signals may be properly displayed by selecting proper line signals from a group of video line signals, which are prepared from the line signals under study to have the proper delay compensation.

While simple means for providing correlation have not been previously recognized, it has been appreciated that decoding becomes more difficult if a plurality of random variables are introduced into the transmission. As a result, many variations in scrambling have been proposed in order to add further complexity to the scrambled video information. For example, a system with two scrambling variables is shown in United States Patent Number 2,567,539, entitled Subscriber Television System, by N. W. Aram, issued September 11, 1951. In this system, one of the scrambled variables is transmitted as the modulation component of a radio carrier and the other is transmitted by means of a line.

Increasing the number of variables in a code does not affect the existence of correlation, although detection of correlation does become more difficult. Moreover, as the coding complexity is increased in the transmitter, the complexity of apparatus required for decoding at the receiver is also increased. The present invention obviates these disadvantages by enabling the utilization of a coding system with a reduced or random correlation, wherein a discontinuity which would normally be present is modified in a manner which minimizes or completely destroys the possibility of detection by correlation. Moreover, the apparatus required at a transmitter for obtaining minimal correlation, according to the invention, does not require any other apparatus for receivers which are equipped with decoding apparatus used previously with that transmitter. In other words, with this invention, while decoding by employment of correlation techniques is made more difficult, decoding by subscriber receivers used prior to employing this invention is still possible without any other apparatus.

According to the basic principle of the invention, a random correlation is obtained by storing in separate memory mediums those portions of the video information to be transmitted which are to immediately precede and those which are to follow a discontinuity which normally occurs. The first stage is to obtain "following" video in advance so that it can be introduced into the completed sequence as required. The entire video transmission is then stored in a memory, or delayed, for a time interval corresponding to the period during which the video information in the separate memory mediums is combined either to create a transmission with a random point of discontinuity or a transmission where a gradual transition occurs between the portion which would normally precede the discontinuity and that which would follow it.

The basic structural embodiment of the invention may be considered to comprise a first memory device for storing the portion preceding the video transition period, where the transition may be either a random point of discontinuity or a gradual fading from one portion to the next; a second memory for the portion following the video transition period; and a delay or storage device for the entire transmission corresponding to the transition period so that a discontinuity may be replaced with signals obtained from the separate memory devices. The signals of the normal video transmission and those of the memory device are superimposed through a combining or mixing circuit to provide a composite video transmission which is scrambled with random or reduced correlation.

The present invention is particularly useful when employed with a cryptographic method used for transmitting video of the type wherein all vertical synchronizing information is eliminated, and the vertical retrace interval is indicated by a series of coded signals associated with the horizontal sync signals. This scrambling technique may be referred to as "vertical-rolling" scrambling, since the resulting scrambled picture appears to roll at a random rate. The vertical-rolling scrambling technique offers an excellent opportunity for the utilization of the random or reduced correlation methods of the present invention, since only a single discontinuity would normally occur, namely, the randomly occurring vertical retrace interval. The present invention, of course, is not limited to utilization in single discontinuity systems of this type. Without the use of the present invention, the vertical-rolling scrambling can be readily "decoded" since it is not too difficult to find and reconstruct the missing vertical information.

In the vertical-rolling system utilization of the invention the last integral line preceding the vertical-blanking interval is the portion of the video information which precedes the discontinuity. This last integral line is stored in a first memory medium which may conveniently be a delay line. The portion which follows the discontinuity in the vertical-rolling scrambling system is the first integral line following the vertical-blanking period which would normally exist.

According to one method of the invention, the video portions in the first and second memory mediums are combined in a manner which provides a gradual transition from the portion preceding the discontinuity to the portion following the discontinuity. The specific circuits employed for this transition may be similar to the well-known video fading circuits, where one picture is gradually faded as a second picture is introduced.

According to another method of the invention, a random point of scrambling discontinuity is obtained by continuously regenerating the portion preceding the scrambling discontinuity which would normally occur until a random time interval when the portions following the normal scrambling discontinuity are picked up. This second portion is continuously regenerated until the remaining transmission pattern is located with which it is related.

The basic structure of the invention has been described in a very general form, rather than in terms of specific elements or connections, in order to emphasize the general nature of the invention. In its generic nature, then, the invention provides a general class of structure or a general method for coding without correlation.

Accordingly, it is an object of the present invention to provide a method and apparatus wherein, in a coded signal transmission, discontinuities which would give away the scrambling function are reduced or randomly varied to prevent detection by correlation.

Another object of the invention is to provide a coding method and apparatus whereby video information may be scrambled in a manner substantially preventing unscrambling thereof by correlation techniques without necessitating a correspondingly complicated reception method.

A further object of the invention is to provide a coding system for scrambling wherein correlation resulting from scrambling discontinuities is directly varied as a random or transition function.

The novel features which are believed to be characteristic of the invention, both as to its organization and method of operation, together with further objects and advantages thereof, will be better understood from the following description considered in connection with the accompanying drawings, in which.

Figure 2:
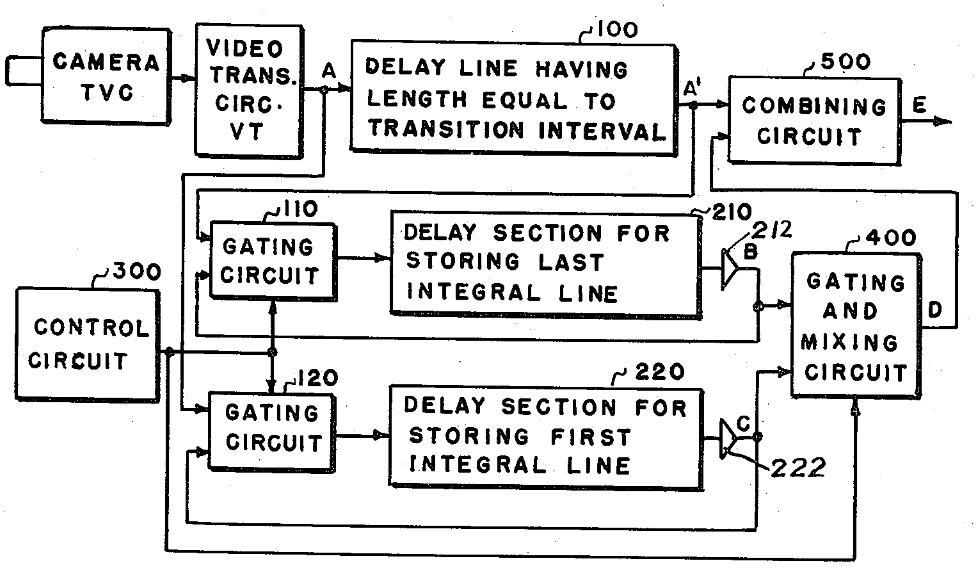
Figure 2 is a block diagram of an embodiment of the invention wherein correlation is eliminated by gradually fading from the last integral line before a scrambling discontinuity to the first integral line follwing the scrambling discontinuity.
Figure 2A:
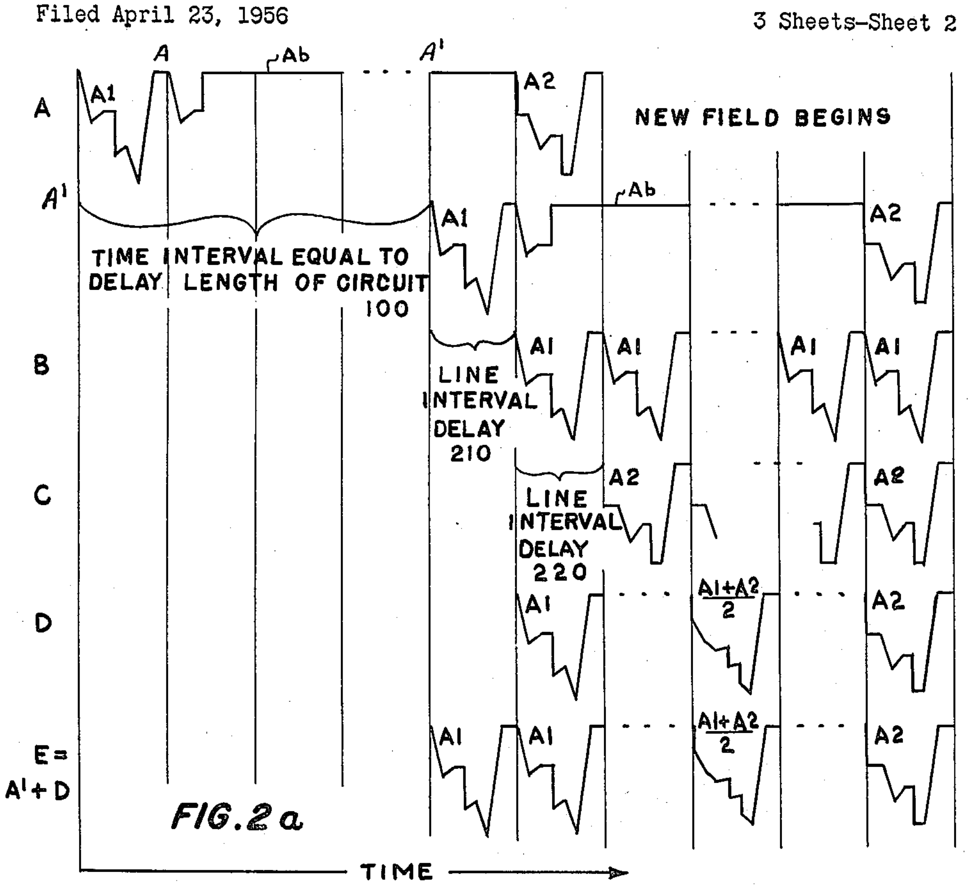
Figure 3:
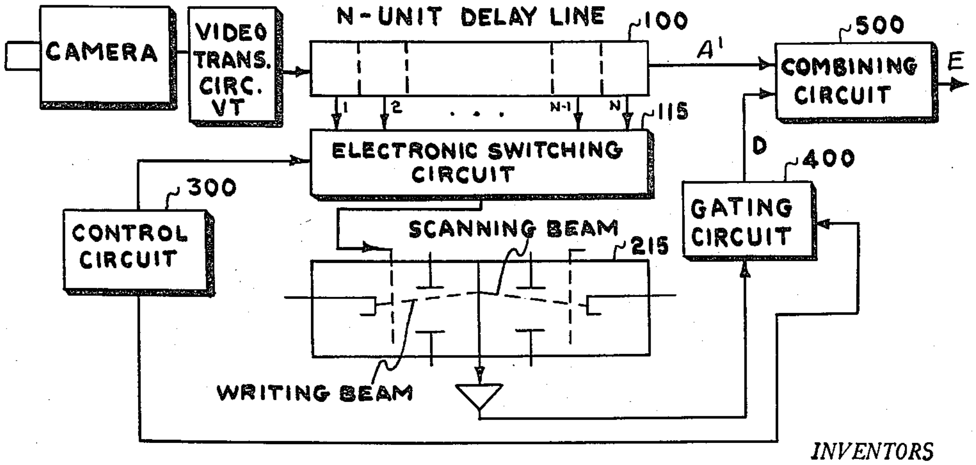
Figure 3A:
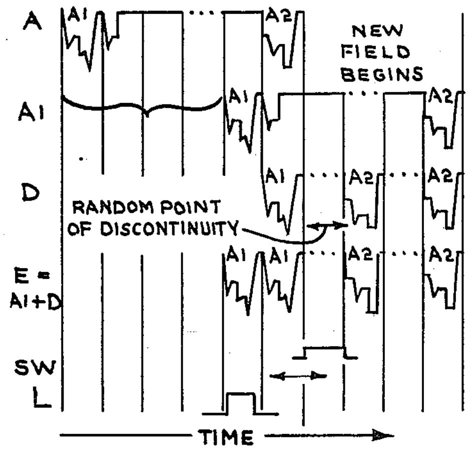
Figure 5:
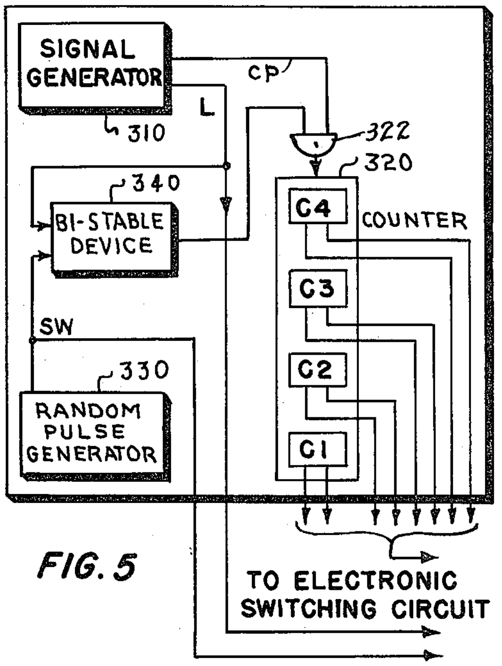
Figure 4:
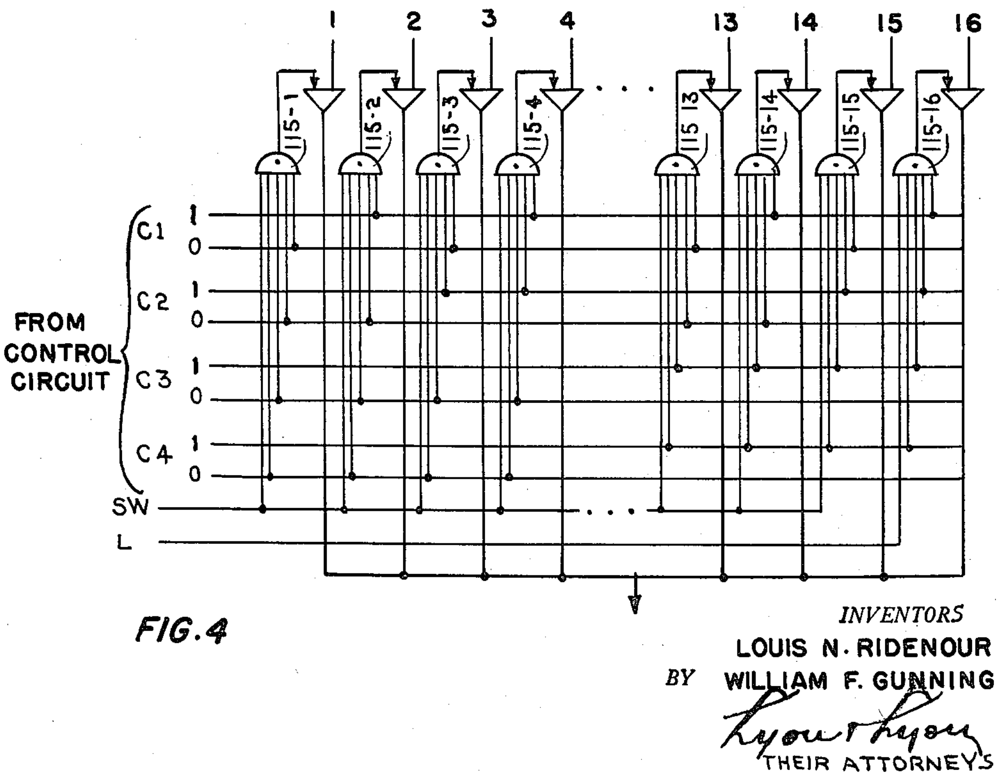

Figure 2*a* is a composite waveform diagram illustrating various signals occurring during the operation of the embodiment of Figure 2;

Figure 3 is a schematic diagram of an embodiment of the invention wherein the scrambling discontinuity is randomly varied to prevent correlation;

Figure 3*a* is a diagram of the waveforms appearing at various points of the embodiment of the invention shown in Figure 3 during a typical operation;

Figure 4 is a schematic diagram of an electronic switching circuit which may be employed in the embodiment of the invention shown in Figure 3; and Figure 5 is a schematic diagram of a control circuit which may be employed in an embodiment of the invention shown in Figure 3.

Figure 1:
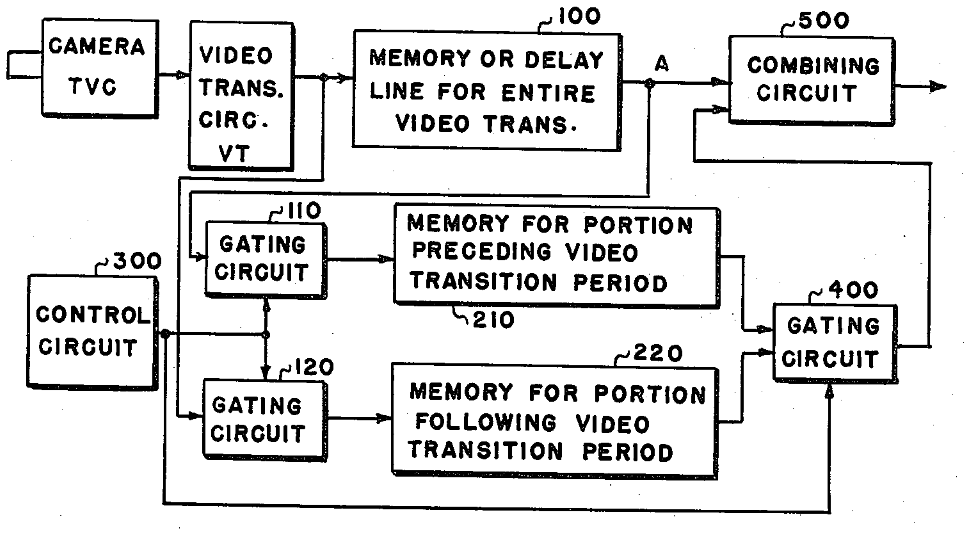
Figure 1 is a block diagram of an embodiment of the invention.

Reference is now made to Figure 1, wherein there is shown a basic arrangement for obtaining a coding system with random correlation, according to the present invention. As indicated in Figure 1, the invention comprises a first storage medium or memory device 100, which receives video signals from a television camera TVC through video transmitting and scrambling circuits VT, and stores these signals for an interval corresponding to the interval of correlation transition, as will be more fully explained in the detailed explanation which follows. The video transmitting and scrambling circuits are known and form no part tof the present invention and will not be described.

Video signals produced by transmitting circuits VT and stored signals from memory device 100 are routed through first and second gating circuits 110 and 120, respectively, to associated memory devices 210 and 220. Memory device 210 is utilized to store the video signals preceding the video transition period, and memory device 220 is utilized to store the video portions following the video transition period. Gating circuits 110 and 120 are controlled through signals produced by control circuit 300, parts of which may also form part of transmitting circuits VT. Circuit 300 provides signals indicating the occurrence of certain video signals, as will be explained below.

The stored video signals in memory devices 210 and 220 are mixed in gating circuit 400. The output signals of gating circuit 400 are then combined with the video signals in memory device 100 in a combining circuit 500. The combining circuit provides output signals coded with reduced or random correlation which may then be transmitted.

The embodiment of Figure 1 has been presented in a very generalized form in order to indicate the generic scope of the invention. To assist in understanding this invention, a more specific arrangement is shown in Figure 2, which is employed, for example, with the vertical-rolling scrambling arrangement previously mentioned. Reference is also made to Figure 2*a*, illustrating wave shapes typical of those obtained with operation of the embodiment of Figure 2.

As indicated in Figure 2, memory circuit 100 can comprise a delay line having a length equal to the transition interval. In this particular utilization of the invention, the last integral line in a given field is the portion which precedes the video transition period, and the first integral line in the following field is the portion which follows the video transition period. The last and first lines are stored in video delay-line memories 210 and 220, respectively. Suitable forms of video delay lines are described in United States Patent Number 2,624,804, for Solid Delay Line, by Arenberg, issued January 6, 1953.

The gating circuits 110 and 120 shown in Figure 2 operate in a manner similar to those represented in Figure 1, except that they are also respectively utilized to provide two circulation paths which respectively include delay sections 210 and 220, the signals of which are respectively passed through appropriate amplification stages 212, 222, as indicated. The video signals B and C produced by delay lines 210 and 220 are combined in a gating and mixing circuit 400 which produces a composite signal D which is similar to the signals of video waveform B at the beginning of the video transition and gradually become similar to the waveform C at the end of the transition period. Signals D and delayed signals A′, corresponding to the normal video transmission A, produced by circuit VT, are combined in a combining circuit 500 to produce scrambled signals with reduced or minimum correlation designated as signal E in Figures 2 and 2*a*.

The operation of the embodiment of the invention shown in Figure 2 is best understood by referring to the composite waveform diagram of Figure 2*a*. It will be noted that in Figure 2*a* time is assumed to increase from left to right so that the waveform section A1 of signal A corresponds to the last integral line preceding the vertical-blanking interval A*b* (as indicated) and the waveform section A2 corresponds to the first integral line following the vertical blanking portion A*b*. The video signal information which follows A2 is not shown but is indicated as forming part of a new field. It will be noted that delay lines 210 and 220 are assumed to store the last and first integral lines, respectively, rather than merely the last and first lines. This assumption has been made due to the fact that if standard interlace transmission is utilized the vertical-blanking signal would cut out one-half of the last line and one-half of the first line during alternate fields. It is not necessary, of course, that standard interlace be utilized in practicing the invention.

In operation, control circuit 300 produces a signal indicating the time when the last integral line A1 is available in signal A′, at the output circuit of delay line 100. The particular time when this occurs is a function of the delay-line length of circuit 100 which has not yet been specified since this depends upon the length of the transition interval, which will be explained. However, the manner in which such a control signal may be obtained is believed to be well known in the electronic art; specific illustration of suitable circuits, therefore, is deemed unnecessary.

The signal indicating the availability of line A1 in memory 100 is utilized to route this line through circuit 110 to delay section 210, which has a circulation path completed through circuit 110 and produces corresponding delayed output signals B as indicated in Figure 2*a*. Thus, the waveform B appears as a series of repetitions of the waveform portion A1 corresponding to a series of regenerations in delay section 210.

Control circuit 300 also produces a gating signal indicating when the first integral line of the next field is available before entering memory 100. This gating signal is utilized to control the operation of gating circuit 120 to route the first line into delay section 220, which has its circulation path completed through circuit 120 and produces a corresponding output signal C delayed by one line interval, as indicated in Figure 2*a*. The waveform C, then, is a series of repetitions of the waveform portion A2 obtained from signal A and corresponding to the first integral line of a new field following the vertical-blanking interval A*b*.

The signals B and C, then, are mixed in circuit 400 in a gradual fading manner so that the output signal D produced thereby initially corresponds to waveform portion A1 and is gradually faded into waveform portion A2. The halfway transition signal, indicated as $$\tfrac{1}{2}A1+\tfrac{1}{2}A2$$

is shown in order to illustrate the typical waveform pattern of a signal during the transition period.

At this point it is helpful to consider the varying lengths that the transition period or interval may assume. If the enitre vertical-blanking interval is to be utilized for random or transition correlation reduction, then the interval is equal to the vertical-blanking period plus one line interval to compensate for interlace and allow for storage of the last line while reading the first. In this case, the transition described above begins immediately upon obtaining the signals A1 and A2 from circuits VT and 100. The delay-line length of circuit 100, then, must provide a delay equal to the vertical-blanking period plus one line interval.

However, the transition interval may be shorter than the vertical-blanking period and, in this case, the last integral line before the vertical-blanking period is regenerated without fading and combined with the remainder of the video transmission in combining circuit 500. The transition interval may begin at any time in the remainder of the vertical interval and after the time when the first integral line is available from circuit VT. In this situation, delay line 100 has a length which is shorter than the vertical-blanking period by an amount corresponding to the period between the availability of the last integral line and the availability of the first integral line.

The waveform E, then, appears at the output circuit of combining circuit 500 delayed with respect to the signals proudced by circuit VT by an amount equal to the transition interval or the corresponding length of delay line 100. The waveform E, it will be noted, is composed of the waveform A′ plus the waveform D. The complete video transmission then comprises a series of video lines without any point of sharp ever-present discontinuity during any portion of the transmission. Thus, it is very much more difficult and perhaps even impossible for a nonsubscriber to determine the time for the vertical retrace by correlating the scrambled picture which he receives line by line. Moreover, the coded information, transmitted to the subscriber, is made no more complicated by the method of preventing correlation just described.

Another form of the invention is shown in Figure 3, where correlation is eliminated by randomly varying the point of discontinuity between the last integral line of a field and the first integral line of the next field in a vertical-rolling type of scrambling system. As indicated in Figure 3, the embodiment comprises an N-unit delay line for receiving the signals A produced by circuit VT and producing N discrete series of video-output signals corresponding to N discrete points of random correlation, as will be described. The total delay length of line 100 corresponds, as above, to the transition period which in this case is the period of random points of correlation.

The signals produced by delay line 100 are routed through an electronic switching circuit 115, providing a selection function which replaces the separate gating circuits 110 and 120, as in Figures 1 and 2. The signals produced by switching circuit 115 are entered into a memory device 215, which provides a storage capacity corresponding to both memory devices 210 and 220 of Figure 1. Memory device 215 is illustrated as a cathode-ray tube storage device, in order to indicate another possible storage medium which may be utilized. The signals produced by storage tube 215 are amplified and applied to a gating circuit 400, which routes output signals from memory device 215 to combining circuit 500 under the control of circuit 300 during the transition interval.

Several suitable types of storage tubes are available. For example, a "Graphechon" may be utilized, the characteristics of which are described on pages 230 through 250 of an article by A. H. Benner et al., entitled Graphechon Writing Characteristics, published in the RCA Review, volume XII, June 1951. Another tube which is suitable is the "Metrechon," described on pages 145 through 162 of an article entitled The Metrechon—a Halftone-Picture Storage Tube, by L. Pensak, published in the RCA Review, volume 15, June 1954. In addition, other storage tubes are described in a book entitled Storage Tubes and Their Basic Principles, by M. Knoll et al., published in 1952 by John Wiley & Sons, New York.

In the embodiment of the invention shown in Figure 3, the last integral line is selected through switching circuit 115 and is continuously regenerated until a random time interval occurs, the time interval being specified by a control signal S*w* produced by control circuit 300. When control signal S*w* is received, as indicated in Figure 3*a*, the first integral line is read from delay line 100 through electronic switching circuit 115 and applied to storage tube circuit 215.

As a result, the waveform D includes a point of discontinuity between the last integral line and the first integral line at a random point which is determined by the occurrence of switching signal S*w*. The entry of both the last and first integral lines into storage tube 215 makes it unnecessary to include a mixing circuit, since the information in the storage tube is changed at the desired point of random discontinuity. It will be understood, of course, that a delay line or other storage medium may be utilized in the place of tube 215.

It is believed that the composite waveform diagram of Figure 3*a* will be understood without further explanation due to its similarity to Figure 2*a*. The principal difference is the existence of a random point of discontinuity rather than a gradual transition interval.

Figures 4 and 5 have been included to illustrate typical suitable forms of switching circuit 115 and control circuit 300. Reference is now made to Figure 4, which is a schematic diagram of switching circuit 115. It is assumed that a total of 16 discrete points are available in delay line 100, which may comprise quartz delay-line sections of the type described in the above-mentioned patent by Arenberg. It is further assumed that switching point 16 is utilized to pick up the last integral line when it becomes available as indicated by a control signal L. This control signal is produced by a signal generator 310 (Figure 5) in control circuit 300. Essentially, the switching circuit 115 is a digital switching matrix such as is described on pages 40 through 43 of High-Speed Computing Devices by Engineering Research Associates, published in 1950 by the McGraw-Hill Book Company, New York and London. A logical representation including video AND gates 115–1 through 115–16 is utilized in order to clearly present the switching function which is utilized. Essentially, each video AND gate is controlled by a different binary signal set in accordance with a conventional binary code as indicated in Table I below:

*Table I*

| C4 | C3 | C2 | C1 | Switching Point |
|---|---|---|---|---|
| 0 | 0 | 0 | 0 | 1 |
| 0 | 0 | 0 | 1 | 2 |
| 0 | 0 | 1 | 0 | 3 |
| 0 | 0 | 1 | 1 | 4 |
| | | | . | |
| | | | . | |
| 1 | 1 | 0 | 0 | 13 |
| 1 | 1 | 0 | 1 | 14 |
| 1 | 1 | 1 | 0 | 15 |
| 1 | 1 | 1 | 1 | 16 |

The signal pairs C1, C2, C3, and C4 are produced by binary counting stages in counter 320 of control circuit 300. Each pair includes a 1-representing signal and a 0-representing signal. Table I indicates, then, the particular switching point which is selected for each of the code combinations shown. Thus the code combination 0010 selects switching point 3 and routes signals produced by delay line 100 from the corresponding point 3 through a video AND gate 115–3. It will be noted that each AND gate is also controlled by the control signal S*w* produced by a random-pulse generator 330 of control circuit 300. Thus, it is only at such time as signal S*w* indicates that the first integral line is to be routed to storage tube 215 that the selection, according to the setting of counter 320, is made.

The operation of the random selection may be better understood after considering the control circuit of Figure 5 in further detail. It will be noted that control circuit 300 includes a bistable device 340, such as a flip-flop circuit, in addition to the other circuits previously mentioned. Bistable device 340 is set to one stable state when the last line has been located, as indicated by signal L. This setting of device 340 initiates the counting operation of counter 320 by enabling AND gate 322 allowing pulses C*p* to be passed to the counter which counts signals C*p*, one pulse C*p* being produced at the beginning of each line interval.

Device 340 is reset to its other stable state upon receipt of the leading portion of signal S*w*, indicating that counting is to cease and that a selection is to be made through switching circuit 115 according to the counter setting. Since signal S*w* occurs at any random time, due to the nature of random-pulse generator 330, the setting of counter 320 will be a random one. In addition to terminating the counting operation, the trailing portion of signal S*w* is also utilized to reset counter 320 to state 1111, so that the last integral line will be selected through switching point 16 upon receipt of the next control signal L as a part of the next cycle of operation.

It may be seen, then, that essentially the operation of switching circuit 115 is first to route the last integral line to storage tube 215 and to then sequentially scan the other output points of delay line 100 so as to continuously follow the first integral line. In the particular illustration described, the scanning is assumed to commence as soon as the last line has been located. This necessitates that delay line 100 be as long as the interval between the first and last integral lines. However, it is also possible to pick up the last integral line through switching point 16 and then to wait until a second control signal is produced by signal generator 310, indicating the availability of the first integral line where delay line 100 is shorter than the vertical-blanking period.

It is not considered that a more detailed explanation of the circuits of Figures 4 and 5 will aid in the understanding of the basic concept of the invention. Moreover, the circuits which are shown are assumed to be conventional and may be found in textbooks relating to TV engineering, such as Television Engineering, by Donald G. Fink, published in 1952 by the McGraw-Hill Book Company, Inc., or in textbooks relating to computing techniques, such as the above-mentioned High-Speed Computing Devices. The text by D. G. Fink also provides information regarding suitable forms for the video-gating circuits described and for combining circuit 500 as well as suitable types of video amplifiers.

From the foregoing description, it is apparent that the present invention provides a coding system or corresponding method wherein one or more discontinuities which might serve as clues to enable the discovery of a scrambling function may be reduced or randomly varied to disguise their presence and reduce the possibility of unauthorized decoding by correlation methods. It has been pointed out that the methods and circuits described do not necessitate further complexity in receivers where the subscribers' code is available.

An attempt has been made to illustrate the invention in a very general manner, since a considerable class of circuits may be utilized to realize the inventive concept or method. Thus, a very large class of storage mediums are suitable, delay lines and a cathode-ray storage tube being specifically illustrated.

While only two basic methods have been described relating to the reduction of correlation through a gradual transition function and the prevention of correlation by means of a random function, it will be understood that other techniques may be applied, as for example, a combination of these two methods where gradual fading forms a part of the transition period and a random discontinuity is introduced at a subsequent point.

We claim:

1. A system for minimizing the possibility of unscrambling by utilizing correlation techniques resulting from the introduction of functions into information transmitted by the introduction of discontinuities therein with a preset period for transition from information-to-discontinuity and from discontinuity-to-information, said system comprising first means for receiving and storing the entire transmission for a period corresponding to the interval selected for a transition from the information portion to precede a discontinuity in information transmission to that portion to follow the discontinuity, second means for selecting and storing the information portion to precede said transition period, third means for selecting and storing the portion to follow said transition period, fourth means coupled to said second and third means for combining selected portions of the signals produced by said second and third means to produce a composite output signal with minimized correlation to said discontinuity, and fifth means coupling said first and fourth means for combining the stored transmission and the composite signal produced by said fifth means to form a transmission where discontinuities have been minimized.

2. A circuit for minimizing signal correlation in scrambled signal information having discontinuities with a predetermined interval being provided for transition between the transmission-of-signal information and the discontinuity and the resumption of the transmission-of-signal information after the discontinuity, said circuit comprising first and second memory devices for storing those portions of the signal information which are respectively to precede and follow any discontinunity which would normally occur, a third memory device for storing all signal information for a time interval corresponding to the period of transition desired between the portion preceding and the portion following discontinuities, first and second gating circuits for selecting said preceding and following portions and entering said portions into said first and second memory devices, respectively, a third gating circuit coupled to said first and second memory devices for mixing the signals corresponding to said preceding and following portions to minimize correlation with said discontinuities, and an output circuit for combining said information signals with the fixed signals produced by said third gating circuit to produce a composite output signal with minimal correlation.

3. The circuit defined in claim 2 wherein said first and second memory devices include means to return the output signals produced by said first and second memory devices, respectively, through said first and second gating circuits, and wherein said third gating circuit includes means to provide a gradual fading from the signal produced by said first delay section to the signal produced by said second delay section to produce a mixed signal where a gradual transition is performed to minimize correlation.

4. A system for minimizing correlation possibilities in a coded video transmission having portions transmitted in a normal mode and portions transmitted in a coded mode with predetermined transition periods before and after coded mode transmissions comprising an N-unit delay line having a total delay time substantially equal to the period of transition between the coded-mode and normal-mode portions of said transmission, means for applying said coded video to said N-unit delay line, an electronic switching device having N-input circuits coupled to said N-units of said delay line, storage means coupled to receive an output from said electronic switching device, means to sequentially switch at random intervals said electronic switching device to successive units of said delay line to store in said storage means selected signal changes occurring between normal-mode and coded-mode portions of said transmission, means to read out said stored signal changes from said storage means, and means at the output of said N-unit delay line to insert said signal changes read out from said storage means into the transition period of said coded video transmission existing between normal-mode and coded-mode portions of said transmission.

5. In a video transmission system wherein a video scrambling operation is performed, a circuit for performing a gradual transition from the portion of said video transmission signals preceding a video discontinuity to the portion of said video transmission signals following a video discontinuity occurring in said scrambling operation, said circuit comprising a first and second gating circuit having an input and an output, first means for applying said video transmission signals to said first gating circuit input, second means for applying said video transmission signals to said second gating circuit input, control circuit means coupled to said gating circuits for respectively enabling said first gating circuit during the occurrence of first signals and said second gating circuit during the occurrence of second signals where said first signals represent the last integral video signal portion preceding said discontinuity and said second signals represent the first integral video signal portion following said discontinuity, a first delay section connected to said first gate circuit output for receiving said first video signals, said first delay section including means for circulating its contents in a circulating path including said first gating circuit for producing a series of first video signals, a second delay section connected to said second gate circuit output for receiving said second video signals, said second delay section including means for circulating its contents in a circulating path including said second gating circuit for producing a series of second video signals, gating and mixing circuit means coupled to said first and second delay sections for producing third video signals from first and second video signals received from said first and second delay sections, said third video signals comprising signals corresponding to a gradual transition from said first video signals to said second video signals, a delay line having an input and output and providing a delay interval equal to the transition interval from said first video signals to said second video signals, means for applying said video transmission signals to said delay line, said first means for applying said transmission signals to said first gating circuit being connected to said delay line input, said second means for applying said transmission signals to said second gating circuit being connected to said delay line output, and a combining circuit connected to said delay line output and to receive third signals from said gating and mixing circuit for producing combined signals comprising a composite video transmission having minimized correlation.

References Cited in the file of this patent

UNITED STATES PATENTS

| | | |
|---|---|---|
| 2,398,641 | Homrighous | Apr. 16, 1946 |
| 2,523,556 | Burrell | Sept. 26, 1950 |
| 2,752,415 | Roschke | June 26, 1956 |
| 2,769,854 | Bridges | Nov. 6, 1956 |